United States Patent [19]
Roach et al.

[11] Patent Number: 5,466,756
[45] Date of Patent: Nov. 14, 1995

[54] METHYL METHACRYLATE COMPOSITIONS

[75] Inventors: Donald E. Roach, Willingboro, N.J.; Paul J. Keating, NewportVille, Pa.

[73] Assignee: Rohm and Haas Company, Philadelphia, Pa.

[21] Appl. No.: 307,992

[22] Filed: Sep. 15, 1994

Related U.S. Application Data

[62] Division of Ser. No. 930,496, Aug. 17, 1992, abandoned, which is a division of Ser. No. 739,027, Aug. 1, 1991, abandoned, which is a division of Ser. No. 577,821, Jul. 26, 1990, Pat. No. 5,061,747, which is a continuation of Ser. No. 385,139, Jul. 25, 1989, abandoned, which is a continuation-in-part of Ser. No. 276,850, Nov. 28, 1988, abandoned.

[51] Int. Cl.$^6$ ........................................................ C08F 8/12
[52] U.S. Cl. ........................................ 525/330.6; 525/384
[58] Field of Search ................................ 525/330.6, 384, 525/329.2, 383

[56] References Cited

U.S. PATENT DOCUMENTS

| | | | |
|---|---|---|---|
| 2,829,067 | 4/1958 | Eastland | 524/386 |
| 3,029,228 | 4/1962 | Glavis | 260/86.1 |
| 3,879,495 | 4/1975 | Fujii et al. | 260/878 |
| 4,056,559 | 11/1977 | Lewis et al. | 526/212 |
| 4,478,972 | 10/1984 | Conrady | 524/388 |
| 4,550,136 | 10/1985 | Hoech | 524/718 |
| 5,061,747 | 10/1991 | Roach et al. | 524/379 |

FOREIGN PATENT DOCUMENTS 2169298 12/1985 United Kingdom .

OTHER PUBLICATIONS

Soviet J. Opt. Tech., 53, 361–2 (1986)—Eremeeva et al. Effect of low–molecular–weight additives on the radiation strength of transparent polymers.

On the Mechanism of Polymer Destruction Under UV/and Gamma–Irradiation: The Influence of Low Molecular Weight Additives Related to Vibrational Cross–Relaxation, A. S. Belinchenko et al., Sixth Symposium on Radiation Chemistry, (1986), pp. 535–538.

Primary Examiner—Jeffrey T. Smith
Attorney, Agent, or Firm—Roger K. Graham

[57] ABSTRACT

Aliphatic alcohol, and high boiling point hydroxy compound additives are added to poly methyl methacrylate to improve the ultraviolet radiation resistance of the polymer. The additives may be incorporated into the poly methyl methacrylate by including the additives with the monomers prior to polymerization. Alternatively, the additives may be incorporated into the poly methylmethacrylate by addition to polymerized methyl methacrylate.

9 Claims, No Drawings

METHYL METHACRYLATE COMPOSITIONS

This application is a division of U.S. application Ser. No. 07/930,496, filed Aug. 17, 1992, now abandoned which is a division of U.S. application Ser. No. 07/739,027, filed Aug. 1, 1991, now abandoned which is a division of U.S. application Ser. No. 07/577,821, filed Jul. 26, 1990, now U.S. Pat. No. 5,061,747, which is a continuation of U.S. application Ser. No. 07/385,139, filed Jul. 25, 1989, now abandoned which is a continuation-in-part of U.S. application Ser. No. 07/276,850, filed Nov. 28, 1988 now abandoned.

FIELD OF THE INVENTION

The present invention is directed to acrylic polymer compositions which may be used to form plastic products which have increased resistance to ultraviolet radiation and weathering. In particular, this invention relates to methyl methacrylate products which show improved transparency to ultraviolet radiation.

BACKGROUND OF THE INVENTION

Ultraviolet radiation causes methyl methacrylate polymers to deteriorate after as little as 100 hours of exposure. Ultraviolet radiation also tends to cause methyl methacrylate polymers to "yellow" which concomitantly reduces the ability of the methyl methacrylate to transmit ultraviolet radiation. Reduction in the ability of methyl methacrylate polymers to transmit ultraviolet radiation is a concern of the sunbed industry because this usually reduces the efficiency of the tanning process.

The art has attempted to address the degrading effects of ultraviolet radiation on methyl methacrylate by incorporating light stabilizers into these materials. For example, U.S. Pat. No. 4,550,136 adds sterically hindered amines (HALS) such as 2,2,6,6-tetramethyl-piperidine to the methyl methacrylate monomer prior to polymerization. Although the addition of (HALS) produces methyl methacrylate polymers with improved resistance to ultraviolet radiation, the addition of (HALS) is expensive.

The art has also attempted to improve the ultraviolet radiation resistance of acrylics by addition of propyl alcohol. As discussed in the article by A. S. Belichenkol et al, entitled "On the Mechanism of Polymer Destruction under UV and Gamma Irradiation: The Influence of Low Molecular Weight Additives Related to Vibrational Cross-Relaxation", *Sixth Symposium on Radiation Chemistry*, (1986), pages 535–538, polymer samples were prepared by bulk radical polymerization of monomer compositions of methyl methacrylate which incorporate about 5–20% propyl alcohol. The resultant polymers showed improved resistance to ultraviolet radiation for short exposures of about 100 hours. The large amounts of more than 5% propyl alcohol, however, would be expected to degrade the physical and mechanical properties of these polymers.

A need therefore exists to provide polymerized methyl methacrylate compositions which may be inexpensively manufactured and which show improved resistance to prolonged exposures to ultraviolet radiation without the need for addition of large amounts of additives.

SUMMARY OF THE INVENTION

The invention is directed to polymeric methacrylates which show improved resistance to prolonged exposure to ultraviolet radiation. The mixtures of monomers which are used to form the polymeric methacrylates include a Base Mix of monomers of alkyl methacrylates such as methyl methacrylate and an alkyl acrylate which has one to four carbons in the alkyl group. Alcohols, high boiling point hydroxy compounds, and mixtures thereof may be added to the Base Mix of monomers prior to polymerization. Alternatively, the alcohol, high boiling point hydroxy compounds, and mixtures thereof may be added to the polymerized Base Mix. The high boiling point hydroxy compounds either may be substituted for the alcohol additives or combined with the alcohol additives. Chain transfer agents for controlling the molecular weight of the resultant polymer also may be added to the Base Mix of monomers.

The compositions of the invention can be formed into sheet products and complex shaped articles which show surprisingly improved resistance to ultraviolet radiation. The polymeric compositions may also be formed into molding materials for use in, for example, the manufacture of melt calendered sheet products and complex molded articles.

DETAILED DESCRIPTION OF THE INVENTION

Having summarized the invention, the invention will now be discussed in detail by reference to the following specification and non-limiting examples.

In accordance with one aspect of the invention, hereinafter referred to as "pre-addition", aliphatic alcohols, high boiling point hydroxy compounds or combinations thereof, as well as additional additives such as chain transfer agents, can be admixed with a Base Mix of monomers of alkyl methacrylate and alkyl acrylate. Preferably, the alkyl methacrylate is methyl methacrylate (MMA) and, the alkyl acrylate is preferably ethyl acrylate(EA). Other alkyl acrylates such as butyl acrylate and methyl acrylate also may be employed with (MMA). (MMA) may constitute from about 90 to about 100 percent of the Base Mix. Correspondingly, up to about 10% alkyl acrylate may be included in the Base Mix. Preferably, the Base Mix of monomers include about 96% methyl methacrylate and about 4% ethyl acrylate.

In pre-addition, about 0.5 to 2.0% of an aliphatic alcohol is added to the Base Mix. Preferably, aliphatic primary or secondary alcohols which have 1–10 carbons are added to the Base Mix. Most preferably, methyl and ethyl alcohols are added to the Base Mix. As an alternative embodiment, mixtures of aliphatic alcohols may be added to the Base Mix composition. As a further alternative embodiment, high boiling point hydroxy compounds such as ethylene glycol and glycerin may be substituted for or combined with the aliphatic alcohol. Amounts of additives outside of the range of one-half to two percent may be added to the Base Mix provided that the amount of additive does not degrade the physical properties of the resultant alkyl methacrylate polymeric product. Additionally, a chain transfer agent, such as about 0.5% of n-dodecylmercaptan("n-DDM") may be added to the Base Mix to control the molecular weight of the resultant polymeric material. Preferably, the amount of the chain transfer agent added to the Base Mix composition is sufficient to produce a polymeric material with a molecular weight of 100,000–500,000.

After the additives have been added to the Base Mix of monomers, the resultant composition may be formed into, for example, polymerized sheet products, by for example, standard cell casting techniques. Other techniques, such as emulsion polymerization and suspension polymerization also may be employed to provide polymerized products.

PRE-ADDITION: GENERAL PROCEDURE: EXAMPLES 1–12

In accordance with the pre-addition aspect of the invention, a Base Mix of monomers of (MMA) and an alkyl acrylate such as ethyl acrylate (EA) is prepared. Alcohol additives which have 1–10 carbons, or high boiling point hydroxy compounds such as butyl lactate, ethylene glycol or glycerin, are added to the Base Mix. Cell cast sheet products may be formed by agitating and pouring the mixtures of monomers and additives into a sealed mold. The mixture is heated to about 45– 120C. to substantially completely polymerize the Base Mix to provide cell cast sheet products of polymerized methyl methacrylate polymer (PMMA).

The effects of the alcohol additives and high boiling point hydroxy compounds on the ultraviolet radiation resistance of the (PMMA) products produced in accordance with pre-addition were determined by subjecting the (PMMA) products to prolonged exposures of ultraviolet radiation over the wavelength range of 290–400 nanometers(NM) in accordance with ASTM standard G-53–84. Samples, measuring about 0.170 inches in thickness, were exposed to 290–320 (NM) ("UVB") radiation from a Phillips Corporation FS40 fluorescent lamp having a peak emission at 314 (NM) and a 1% of peak emission cutoff at 284 (NM). Additional samples of these (PMMA) products were exposed to the range of 315–400 (NM) ("UVA") radiation from a Q-Panel Corporation UVA-351 lamp having a peak emission at 314 (Nm) and a 1% peak emission cutoff at 284 (NM).

The radiation resistance of the (PMMA) products was evaluated by comparing, by means of a spectrophotometer, the percent total ultraviolet transmittance at wavelengths of 300 (NM) and 340 (NM) through the (PMMA) products both before and after exposure of the (PMMA) products to (UVA) and (UVB) radiation.

In addition to evaluating the ultraviolet radiation resistance of these compositions on the basis of the percent total transmittance of 300 and 340 (NM) radiation, the effects of the alcohol additives and high boiling point hydroxy compounds on the extent of yellowing of (PMMA) compositions produced by pre-addition was also measured. The extent of yellowing was measured by comparing the yellow color in the (PMMA) product after exposure to either (UVA) and (UVB) radiation with the yellow color in the (PMMA) product prior to exposure to either the (UVA) or (UVB) radiation. The result, referred to as the yellowness index (YI), was evaluated according to ASTM test method D1925. The effects of the pre-addition of aliphatic alcohol additives and high boiling point hydroxy compounds on the ultraviolet radiation resistance of cell cast (PMMA) products produced by pre-addition are shown in Table I.

Examples 1–12 of Table I illustrate the effects of pre-addition of alcohol and high boiling point hydroxy additives on the ultraviolet radiation resistance of (PMMA) products formed from a Base Mix of (MMA) and (EA). As shown in Table I, (PMMA) products which employ the alcohol, and high boiling point hydroxy additives retain an extremely high percentage of their transparency at 300 NM after 6000 hours of exposure to (UVA) radiation. As shown in Example 3, (PMMA) that includes (EA) has a transmittance of 300 (NM) radiation of 84.3 percent. The percent total transmittance at 300 (NM) of the composition of Example 3, after exposure to (UVA) radiation for 6000 hours, is 76.9%. Comparing the percent transmittance of 300 NM radiation after 6000 hours of exposure to (UVA) radiation with the material's original transmittance of 84.3% at 3007 NM shows that composition of Example 3 retains about 91.7% of the transmittance of the unexposed (PMMA) composition of Example 3. However, as shown in example 1, (PMMA) which does not employ any additives only retains about 40% of the transmittance at 300 (NM) of the unexposed (PMMA) product of Example 1.

TABLE I

| Composition of Cell Cast (PMMA) | UNEXPOSED MATERIAL | | |
|---|---|---|---|
| | % Total Transmittance of 300 (NM) | % Total Transmittance of 340 (NM) | (Y1) |
| 1. Base Mix | 82.4 | 86.0 | 0.8 |
| 2. Base Mix + 1% $CH_3OH$ | 85.0 | 86.8 | 0.8 |
| 3. Base Mix + 0.5% $C_2H_5OH$ | 84.3 | 86.6 | 0.8 |
| 4. Base Mix + 1% $C_2H_5OH$ | 84.6 | 87.1 | 0.8 |
| 5. Base Mix + 2% $C_2H_4(OH)_2$ | 84.5 | 87.3 | 0.8 |
| 6. Base Mix + 0.5% $C_2H_4(OH)_2$ | 83.3 | 86.4 | 0.8 |
| 7. Base Mix + 1% $C_2H_4(OH)_2$ | 79.7 | 86.4 | 0.8 |
| 8. Base Mix + 1.0% $C_4H_9OH$ | 85.6 | 89.9 | 0.8 |
| 9. Base Mix + 1% $C_6H_{13}OH$ | 85.3 | 89.5 | 0.8 |
| 10. Base Mix + 1% $C_{10}H_{21}OH$ | 85.5 | 89.6 | 0.8 |
| 11. Base Mix + 0.33% n-DDM + 1% $C_2H_5OH$ | 80.5 | 86.4 | 0.7 |
| 12. Base Mix + 0.33% N-DDM + 1% $C_2H_5OH$ | 81.2 | 86.1 | 0.7 |
| Composition of Cell Cast (PMMA) | 6000 Hours-(UVA) Expopsure | | |
| | % Total Transmittance of 300 (NM) | % Total Transmittance of 340 (NM) | Y1) |
| 1. Base Mix | 42.6 | 78.0 | 2.7 |
| 2. Base Mix + 1% $CH_3OH$ | 78.8 | 89.3 | 0.7 |
| 3. Base Mix + 0.5% $C_2H_5OH$ | 76.9 | 88.5 | 0.8 |
| 4. Base Mix + 1% $C_2H_5OH$ | 83.4 | 89.9 | 0.7 |
| 5. Base Mix + 2% $C_2H_4(OH)_2$ | 85.1 | 89.9 | 0.7 |
| 6. Base Mix + 0.5% $C_2H_4(OH)_2$ | 68.8 | 87.2 | 1.0 |
| 7. Base Mix + 1% $C_2H_4(OH)_2$ | 78.1 | 89.1 | 0.8 |

TABLE I-continued

|  | 63.5 | 84.9 | 1.5 |
|---|---|---|---|
| 8. Base Mix + 1.0% $C_4H_9OH$ | 63.5 | 84.9 | 1.5 |
| 9. Base Mix + 1% $C_6H_{13}OH$ | 48.6 | 80.4 | 2.4 |
| 10. Base Mix + 1% $C_{10}H_{21}OH$ | 46.9 | 78.6 | 2.7 |
| 11. Base Mix + 0.33% n-DDM + 1% $C_2H_5OH$ | 82.4 | 89.4 | 0.8 |
| 12. Base Mix + 0.33% N-DDM + 1% $C_2H_5OH$ | 79.1 | 88.5 | 0.8 |

| | 6000 Hours - (UVB) Exposure | | |
|---|---|---|---|
| Composition of Cell Cast (PMMA) | % Total Transmittance of 300 (NM) | % Total Transmittance of 340 (NM) | (YI) |
| 1. Base Mix | 32.7 | 50.2 | 7.2 |
| 2. Base Mix + 1% $CH_3OH$ | 82.4 | 85.7 | 0.9 |
| 3. Base Mix + 0.5% $C_2H_5OH$ | 76.2 | 83.3 | 1.5 |
| 4. Base Mix + 1% $C_2H_5OH$ | 82.9 | 87.6 | 1.0 |
| 5. Base Mix + 2% $C_2H_4(OH)_2$ | 85.7 | 89.4 | 0.8 |
| 6. Base Mix + 0.5% $C_2H_4(OH)_2$ | 72.0 | 80.7 | 2.0 |
| 7. Base Mix + 1% $C_2H_4(OH)_2$ | 81.4 | 86.8 | 1.0 |
| 8. Base Mix + 1.0% $C_4H_9OH$ | | | |
| 9. Base Mix + 1% $C_6H_{13}OH$ | | | |
| 10. Base Mix + 1% $C_{10}H_{21}OH$ | | | |
| 11. Base Mix + 0.33% n-DDM + 1% $C_2H_5OH$ | 74.6 | 81.9 | 0.8 |
| 12. Base Mix + 0.33% N-DDM + 1% $C_2H_5OH$ | 66.6 | 76.3 | 0.8 |

BASE MIX = 96% METHYL METHACRYLATE, 4% ETHYL ACRYLATE

TABLE II

| | | % Transmittance at 300 NM after exposure to (UVA) for | | % Transmittance at 300 NM after exposure to (UVB) for | |
|---|---|---|---|---|---|
| Example | Additive | 0 Hours | 1000 Hours | 0 Hours | 1000 Hours |
| 13. | none | 61.7 | 45.6 | 61.5 | 32.5 |
| 14. | 1% EG[1] | 60.6 | 53.2 | 59.7 | 46.7 |
| 15. | 1% DG[2] | 65.8 | 52.1 | 65.5 | 51.0 |
| 16. | 1% GL[3] | 66.0 | 51.5 | 65.3 | 47.3 |
| 17. | 1% BL[4] | 68.8 | 63.3 | 67.7 | 57.9 |

[1] EG = ethylene glycol
[2] DG = diethylene glycol
[3] GL = glycerin
[4] BL = butyl lactate Pre-addition also may be employed to produce resin molding materials of (PMMA) for use in the manufacture of injection molded components and melt calendered sheets. For example, (PMMA) sheet materials can be crushed into particles and extruded to provide pellets of molding resin materials. Alternatively, the Base Mix of monomers may be formed into molding resin materials by techniques such as emulsion polymerization and suspension polymerization.

As an alternative to pre-addition, alcohol, and high boiling point hydroxy compound additives may be incorporated into (PMMA) by directly treating the (PMMA) with the additives. This technique, hereinafter referred to as "post-addition", is particularly suitable for providing materials for molding and extrusion into complex articles such as covers for high intensity discharge lamps.

A variety of methods may be used to achieve post-addition of the alcohol additives into (PMMA). For example, the additives may be added directly to the liquid polymer. The additives also can be incorporated into the polymer by treating the surface of the polymer with the additives at room temperature and thereafter melting the treated polymer. Post-addition may be performed at temperatures in the range of ambient temperature to about 300 C. Where the additives are applied to liquid (PMMA), high boiling point additives are preferred in order to minimize volatilization of the additive. High boiling point additives which may be employed preferably include aliphatic alcohols which have 4 to 16 carbons. High boiling point additives which are especially preferred for adding to liquid (PMMA) include ethylene glycol, diethylene glycol, butyl lactate and glycerin.

In examples 13 to 17 shown in Table II, (PMMA) is formed by heating a mixture of about 95% methyl methacrylate(MMA), about 4% ethyl acrylate(EA), about 0.20 % n-dodecyl mercaptan(n-DDM) as a chain transfer agent to provide a molecular weight of 100,000 to 500,000 with about 0.02% of a peroxide such as di-tert-butyl peroxide as a polymerization catalyst. The mixture is heated to a temperature and for a time sufficient to cause at least fifty percent converstion to polymer. Preferably, the additives are applied after substantially all of the residual monomers have been removed from the polymer. Thereafter, the residual monomers may be removed prior to "post-addition" of the additives. The additive is applied to the liquid polymer just prior to solidification. Preferably, the additives are applied while the liquid polymer is at a temperature in the range of about 200° C. to about 250° C. Alternatively, the additives may be post-added to the (PMMA) by applying the additives to the (PMMA) at ambient temperature. Thereafter, the treated (PMMA) is heated to above its glass transition temperature, preferably with agitation, to incorporate the additive into polymer.

The effects of the alcohol additives and high boiling point hydroxy compounds on the ultraviolet radiation resistance of the (PMMA) products produced by post-addition were determined by subjecting the (PMMA) products to prolonged exposures of ultraviolet radiation over the wavelength range of 290–400 nanometers(NM) in accordance with ASTM standard G-53-84. Samples of about 0.170 inches thickness were exposed to 290–320 (NM) ("UVB") radiation from a Phillips Corporation FS40 fluorescent lamp having a peak emission at 314 (NM) and a 1% of peak emission cutoff at 284 (NM). Additional samples of these (PMMA) products were exposed to the range of 315–400 (NM) ("UVA") radiation from a Q-Panel Corporation UVA-351 lamp having a peak emission at 314 (NM) and a 1% peak emission cutoff at 284 (NM).

The radiation resistance of the (PMMA) products formed by post-addition was evaluated by comparing, by means of a spectrophotometer, the percent total ultraviolet transmittance at wavelengths of 300 (NM) and 340 (NM) through the (PMMA) products both before and after exposure of the (PMMA) products to (UVA) and (UVB) radiation.

The polymeric materials formed by post-addition, as shown in Table II, also retain a surprisingly high transmittance after exposure to ultraviolet radiation. As shown in Example 14 of Table II, post-addition of one percent of ethylene glycol to (PMMA) provides a material which has an original transmittance to 300 NM (UVA) of 60.6%. This material retains a transmittance to 300 NM (UVA) of 53.2% after 1000 hours exposure to 300NM (UVA). The composition of Example 14 therefore retains a surprisingly large 87.78% of its original transmittance to 300 NM (UVA) radiation. In contrast, example 13 which does not employ any additives, only retains about 73.9% of the original transmittance at 300NM.

While the invention has been described and exemplified in great detail, various modifications, alternative embodiments, alterations and improvements should become apparent without departure from the spirit and scope of the invention.

We claim:

1. A polymeric composition in the form of a molded object, extruded sheet, or cast sheet, consisting essentially of:

a) a polymer comprising predominantly units of methyl methacrylate and b) from about one-half to about two percent by weight, of at least one alcohol, the alcohol containing no more than ten carbon atoms, wherein the at least one alcohol is admixed with the polymer subsequent to its preparation.

2. The composition of claim 1 wherein the alcohol is a monohydric aliphatic alcohol or a polyhydric aliphatic alcohol.

3. The composition of claim 2 wherein the monohydric aliphatic alcohol is methyl alcohol or ethyl alcohol.

4. The composition of claim 2 wherein the polyhydric aliphatic alcohol is ethylene glycol, diethylene glycol, or glycerin.

5. The composition of claim 1 wherein the alcohol is butyl lactate.

6. The composition of claim 1 wherein the polymer further contains units of an alkyl acrylate.

7. The composition of claim 6 wherein the alkyl acrylate is ethyl acrylate, butyl acrylate, or methyl acrylate.

8. The composition of claim 7 wherein the alkyl acrylate is ethyl acrylate and the units of ethyl acrylate are about four percent of the total polymer units.

9. The composition of claim 1 wherein the weight-average molecular weight of the polymer is from about 100,000 to about 500,000 and the polymeric composition is in the form of a molded object or an extruded sheet.

* * * * *